Figure 1:
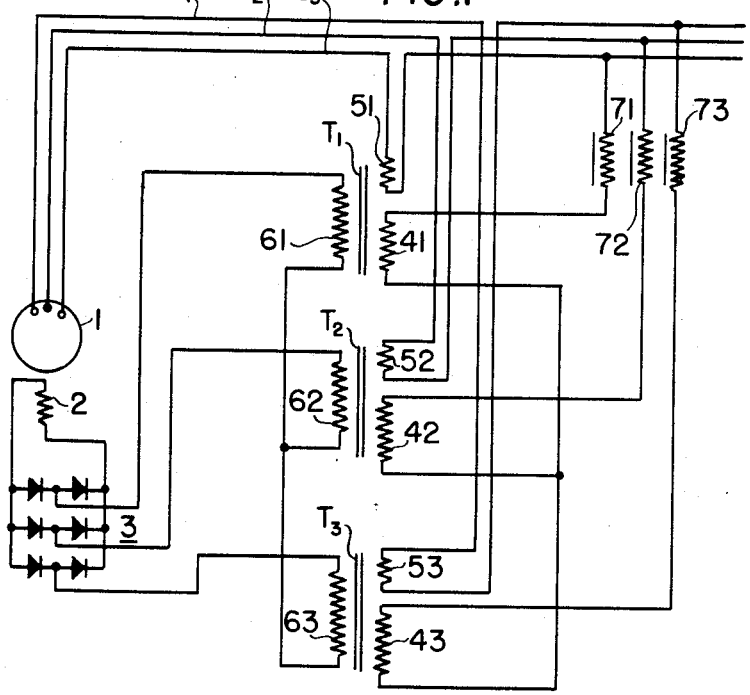

Jan. 13, 1959     K. LUTZ     2,869,066

VOLTAGE REGULATOR FOR SYNCHRONOUS MACHINES

Filed Jan. 7, 1955

2,869,066
VOLTAGE REGULATOR FOR SYNCHRONOUS MACHINES

Karlheinz Lutz, Nurnberg, Germany, assignor to Siemens-Schuckertwerke Aktiengesellschaft, Berlin-Siemensstadt, Germany, a German corporation Application January 7, 1955, Serial No. 480,567

Claims priority, application Germany March 23, 1954

11 Claims. (Cl. 322—25)

My invention relates to apparatus for providing a given dependence of the voltage upon the load of a dynamoelectric machine. More particularly, the invention relates to regulating apparatus for securing a constant terminal voltage of a synchronous alternator with the aid of a rectifier which energizes the direct-current field winding of the machine from the alternating-current line.

It has been proposed to provide the rectifier-energizing transformer of such voltage regulators with two primary windings of which one is traversed by the alternator load current while the other is series connected with an impedance member for producing a load-independent excitation component. For maintaining the current in the second excitation circuit as constant as possible irrespective of the load condition of the synchronous alternator, the impedance member must have a reactive, i. e. wattless, impedance rated for more than eight times the no-load excitation power. If the ratio of excitation current under load to no-load excitation current is larger than two, the reactive impedance must be given a still greater rating. As a consequence, the above-mentioned type of regulating apparatus have heretofore always been equipped with relatively large impedance devices, usually inductance coils, which impose on the machine a considerable pre-loading with wattless power and hence have a detrimental effect upon the economy of operation.

It is an object of my invention to minimize these shortcomings and to afford a satisfactory and economical operation of the voltage-regulated synchronous machine with the aid of relatively small series impedances in the transformer circuit of the excitation system.

I have discovered that, for securing constant terminal voltage at different loads, it is not necessary to require largest feasible constancy as far as the load-independent component of the excitation current is concerned; and that it is therefore possible without detriment to make the reactive impedance of the series impedance devices considerably smaller than heretofore applied.

According to the invention, the reactive (wattless) power rating of the reactive series impedance in the primary circuit of the excitation transformer is 0.4 to 7 times the no-load excitation power. For reasons of economy, however, it is preferable to dimension the reactive impedance to be not more than 4 times the no-load excitation power. On the other hand, the reactive power should not be made extremely small to prevent variations in the resistance of the excitation winding, as may occur due to heating, from appreciably effecting the operating conditions. According to a more specific feature of the invention, therefore, the reactive impedance is so dimensioned that the reactive power with a capacitance-free circuit connection amounts to 2 to 4 times the no-load excitation power.

According to another feature of my invention, however, I compose the series impedance of an inductance and a capacitance component so tuned as to be approximately in resonance at the line frequency. With such a resonance tuning, the reactive power rating of the inductance component can be reduced to as little as 0.4 to 3 times the no-load excitation power of the machine.

Figure 2:
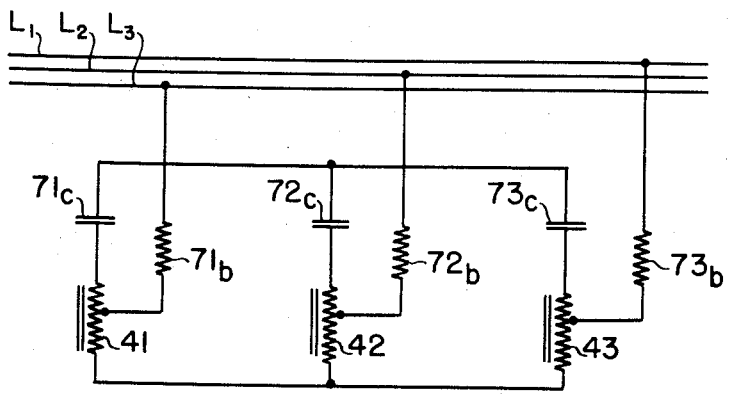

The invention will be further explained with reference to the drawing in which Fig. 1 is a circuit diagram of an alternator regulating system according to the invention, and Fig. 2 shows a modified portion of an otherwise identical system.

The three-phase synchronous alternator 1 according to Fig. 1 is driven from a constant-speed motor (not illustrated), and has its direct-current field winding 2 excited from a rectifier 3. The rectifier is connected to secondary windings 61, 62, 63 of respective transformers $T_1$, $T_2$, $T_3$. Each transformer has two primary windings 41 and 51, 42 and 52, 43 and 53. The primary windings 41, 42, 43 are connected across the buses $L_1$, $L_2$, $L_3$ of the alternating-current line in series with reactive impedance members consisting of reactor coils 71, 72, 73 respectively. The windings 41, 42, 43 provide for the machine a component excitation largely independent of the load current flowing in the line. The windings 51, 52, 53 are series connected in the respective buses $L_1$, $L_2$, $L_3$ and provide a load-responsive component of field excitation.

If in the illustrated circuit connection, using impedance members free of capacitance, the ratio of the number of turns in primary winding 41 (42 or 43) to the number of turns in secondary winding 61 (62 or 63) is denoted by $p$, and the ratio of the number of turns in primary winding 51 (52 or 53) to the number of turns in secondary winding 61 (62 or 63) is denoted by $s$, while the reactive impedance of each impedance member is represented by $z$, then the following equation will result from the balance condition of the ampere turns and from the voltage conditions in the reactor circuit:

$$I_e = \frac{U\frac{p}{z} - sI_1}{1 - R\frac{p^2}{z}}$$

In this equation $I_e$ denotes the excitation current, $U$ the phase voltage of the generator, $R$ the resistance of the alternator field circuit including the rectifier and reduced to the alternating current side of the rectifier, and $I_1$ denotes the generator current which also flows through the windings 51 (52 or 53).

The denominator of the equation consists of a combination of constant resistance magnitudes and hence is a constant value. The numerator of the equation is composed of a component dependent upon the voltage and a component dependent upon the load current. The equation involves no condition as to the magnitude or the constancy of the current flowing in the impedance branch of the circuit.

For a capacitance-free circuit connection, and under the condition that the reactor coils are substantially free of losses, the maximum reactive impedance $X_{max}$ results as:

$$X_{max} = \frac{U^2}{2RI_0^2}$$

wherein $I_0$ denotes the no-load excitation current of the machine. The minimum reactive power therefore is equal to the no-load excitation power of the machine. The influence of resistance variation at a small reactor power can also be eliminated by providing additional capacitors for facilitating the starting of self excitation. Such a modification is shown in Fig. 2, where the impedance members in series with the transformer primary 41 are an inductance coil 71b and a capacitor 71c, the other series impedances of the system being composed in the same manner. In such a modified system, still smaller reactor powers are sufficient if the capacitors are approximately tuned to resonance with the reactors at the rated frequency. In the latter case, a minimum limitation is given by the losses of the reactor winding which make themselves more strongly felt the more the reactive power in the reactor is diminished. In consideration of these circumstances, the lowermost value for the reactor and capacitor power proves to about 0.4 times the no-load excitation power.

The invention affords the advantage that the expenditure in material and space for the circuit combination is greatly diminished. Besides, there results for the generator a considerably smaller pre-loading by reactive power and thus for any given type of generator a greater utilizable power output.

I claim:

1. With a synchronous alternator having an alternating-current output circuit and having direct-current field excitation means, the combination of a voltage regulating system comprising a rectifier connected to said field means to supply excitation thereto, a transformer having a secondary winding connected with said rectifier and having two primary windings, one of said primary windings being series connected in said output circuit to provide a load-dependent component of excitation, reactive impedance means series connected with said other primary winding across said output circuit for providing said other winding with a load-independent component of excitation, said impedance means having a wattless power between 0.4 and 7 times the no-load excitation power of said alternator.

2. With a synchronous alternator having an alternating-current output circuit and having direct-current field excitation means, the combination of a voltage regulating system comprising a rectifier connected to said field means to supply excitation thereto, a transformer having a secondary winding connected with said rectifier and having two primary windings, one of said primary windings being series connected in said output circuit to provide a load-dependent component of excitation, reactive impedance means, a regulating circuit connected in shunt relation to said output circuit and including said impedance means in series with said other primary winding, said regulating circuit having an only inductive reactance of a wattless power between 2 to 4 times the no-load excitation power of said alternator.

3. In a combination as set forth in claim 1, said impedance means comprising an inductance coil and capacitor means tuned to resonance with said coil at the alternator frequency, and said inductance coil having a reactive power 0.4 to 3 times the no-load excitation power of said alternator.

4. An electric apparatus comprising a synchronous generator having its stator connected to a multiphase output line and having a direct-current field circuit to energize its rotor field, a field excitation system comprising a rectifier outputwise connected to energize said direct-current field circuit, an excitation transformer having a multiphase secondary winding connected to energize said rectifier and having two first and second primary multiphase winding means, reactive impedance means connected in series with each of the multiphase windings of the first of said primary winding means and across said multiphase output line for load-independent excitation of said primary winding means from the line voltage, the second of said primary winding means having multiphase windings each connected for excitation by the load current of said generator to provide said transformer with a load-dependent component of excitation, said impedance means having a magnitude such that it supplies a wattless power which is 0.4 to 7 times the no-load excitation power of the generator.

5. An electric apparatus comprising a synchronous generator having its stator connected to a multiphase output line and having a direct-current field circuit to energize its rotor field, a field excitation system comprising a rectifier outputwise connected to energize said direct-current field circuit, an excitation transformer having a multiphase secondary winding connected to energize said rectifier and having two first and second primary multiphase winding means, reactive impedance means connected in series with each of the multiphase windings of the first of said primary winding means and across said multiphase output line for load-independent excitation of said primary winding means from the line voltage, the second of said primary winding means having multiphase windings each connected for excitation by the load current of said generator to provide said transformer with a load-dependent component of excitation, said impedance means having a magnitude such that it supplies a wattless power which is 0.4 to 4 times the no-load excitation power of the generator.

6. An electric apparatus comprising a synchronous generator having its stator connected to a multiphase output line and having a direct-current field circuit to energize its rotor field, a field excitation system comprising a rectifier outputwise connected to energize said direct-current field circuit, an excitation transformer having a multiphase secondary winding connected to energize said rectifier and having two first and second primary multiphase winding means, reactive impedance means connected in series with each of the multiphase windings of the first of said primary winding means and across said multiphase output line for load-independent excitation of said primary winding means from the line voltage, the second of said primary winding means having multiphase windings each connected for excitation by the load current of said generator to provide said transformer with a load-dependent component of excitation, said reactive impedance means comprising inductance elements connected as recited, the reactive impedance means having a magnitude such that it supplies a wattless power which is 2 to 4 times the no-load excitation power of the generator.

7. An electric apparatus comprising a synchronous generator having its stator connected to a multiphase output line and having a direct-current field circuit to energize its rotor field, a field excitation system comprising a rectifier outputwise connected to energize said direct-current field circuit, an excitation transformer having a multiphase secondary winding connected to energize said rectifier and having two first and second primary multiphase winding means, reactive impedance means connected in series with each of the multiphase windings of the first of said primary winding means and across said multiphase output line for load-independent excitation of said primary winding means from the line voltage, the second of said primary winding means having multiphase windings each connected for excitation by the load current of said generator to provide said transformer with a load-dependent component of excitation, said reactive impedance means comprising, for each phase of the output line, an inductance element and a capacitance component in series with each other, the inductance element and capacitance component for each phase voltage being serially connected through a phase winding of the second primary winding means to each of the inductance elements and capacitance components of the other phase voltage, the impedance means having a magnitude such that it supplies a wattless power which is 0.4 to 3 times the no-load excitation power of the generator.

8. An electrical apparatus comprising a synchronous generator having its stator connected to a multiphase alternating-current output line and having a direct-current field circuit to energize its rotor field, a field excitation system comprising a rectifier outputwise connected to energize said direct-current field circuit, a main excitation transformer having a multiphase secondary winding connected to energize said rectifier and having two separate first and second primary multiphase winding means, reactive impedance means comprising inductance elements connected across the phases of said output line, the first of said primary winding means being connected in series with said inductance elements across said multiphase line for load-independent excitation of said primary winding means from the line voltage, the second of said primary winding means having multiphase windings each connected in series in said load circuit for direct excitaton by the load current of the generator to provide said transformer with a load-dependent component of excitation current, said inductance elements having an impedance designed to supply a wattless power which is 0.4 to 7 times the no-load excitation power of the generator, and in accordance with the following relation:

$$I_e = \frac{U \times \frac{P}{z} - s \times I_1}{1 - R \times \frac{p^2}{Z}}$$

in which:

$p$ = the ratio of number of turns in the first primary winding means to the number in the secondary winding
$s$ = the ratio of number of turns in the second primary winding means to the number in the secondary winding
$z$ = reactive impedance of each of said inductance elements
$I_e$ = excitation current
$U$ = phase voltage of the generator
$R$ = resistance of the alternator field circuit including the rectifier and reduced to the alternating side of the rectifier; and
$I_1$ = generator current flowing through the second primary winding means.

9. An electrical apparatus comprising a synchonous generator having its stator connected to a multiphase alternating-current output line and having a direct-current field circuit to energize its rotor field, a field excitation system comprising a rectifier outputwise connected to energize said direct-current field circuit, a multiphase main excitation transformer having a multiphase secondary winding connected to energize said rectifier and having two first and second primary multiphase winding means, reactive impedance means comprising inductance elements connected across the phases of said output line, the first of said primary winding means being connected in series with said inductance elements across said multiphase line for load-independent excitation of said primary winding means from the line voltage, the second of said primary winding means having multiphase windings each connected for direct excitation by the load current of the generator to provide said transformer with a load-dependent component of excitation current, said inductance elements having an impedance designed to supply a wattless power which is 2 to 4 times the no-load excitation power of the generator, and in accordance with the following relation:

$$I_e = \frac{U \times \frac{P}{z} - s \times I_1}{1 - R \times \frac{p^2}{Z}}$$

in which:

$p$ = the ratio of number of turns in the first primary winding means to the number in the secondary winding
$s$ = the ratio of number of turns in the second primary winding means to the number in the secondary winding
$z$ = reactive impedance of each of said inductance elements
$I_e$ = excitation current
$U$ = phase voltage of the generator
$R$ = resistance of the alternator field circuit including the rectifier and reduced to the alternating side of the rectifier; and
$I_1$ = generator current flowing through the second primary winding means.

10. An electrical apparatus comprising a synchronous generator having its stator connected to a multiphase alternating-current output line and having a direct-current field circuit to energize its rotor field, a field excitation system comprising a rectifier outputwise connected to energize said direct-current field circuit, a multiphase main excitation transformer having a multiphase secondary winding connected to energize said rectifier and having two separate first and second primary multiphase winding means, reactive impedance means comprising serially connected inductance elements and capacitance components for and connected across each of the phases of said output line, the first of said primary winding means being connected in series with said inductance elements and capacitance components across said multiphase line for load-independent excitation of said primary winding means from the line voltage, the second of said primary winding means having multiphase windings each connected in series in said load circuit for direct excitation by the load current of the generator to provide said transformer with a load-dependent component of excitation current, said inductance elements and capacitance components having an impedance designed to supply a wattless power which is 0.4 to 3 times the no-load excitation power of the generator, and in accordance with the following relation:

$$I_e = \frac{U \times \frac{P}{z} - s \times I_1}{1 - R \times \frac{p^2}{Z}}$$

in which:

$p$ = the ratio of number of turns in the first primary winding means to the number in the secondary winding
$s$ = the ratio of number of turns in the second primary winding means to the number in the secondary winding
$z$ = impedance of said reactive impedance means for each of the phases
$I_e$ = excitation current
$U$ = phase voltage of the generator
$R$ = resistance of the alternator field circuit including the rectifier and reduced to the alternating side of the rectifier; and
$I_1$ = generator current flowing through the second primary winding means;

the inductance elements and capacitance components being tuned to be approximately in resonance at the line frequency.

11. An electrical apparatus comprising a synchronous generator having its stator connected to a multiphase alternating-current output line and having a direct-current field circuit to energize its rotor field, a field excitation system comprising a rectifier outputwise connected to energize said direct-current field circuit, a multiphase main excitation transformer having a multiphase secondary winding connected to energize said rectifier and having two separate first and second primary multiphase winding means, reactive impedance means connected across the phases of said output line, the first of said primary winding means being connected in series with said impedance means across said multiphase line for load-independent excitation of said primary winding means from the line voltage, the second of said primary winding means having multiphase windings each connected in series in said load circuit for direct excitation by the load current of the generator to provide said transformer with a load-dependent component of excitation current, said impedance means having an impedance designed to supply a wattless power which is 2 to 4 times the no-load excitation power of the generator, and in accordance with the following relation:

$$I_e = \frac{U \times \frac{P}{z} - s \times I_1}{1 - R \times \frac{p^2}{Z}}$$

in which:

$p$ = the ratio of number of turns in the first primary winding means to the number in the secondary winding
$s$ = the ratio of number of turns in the second primary winding means to the number in the secondary winding
$z$ = reactive impedance of said impedance means for each of the phases
$I_e$ = excitation current
$U$ = phase voltage of the generator
$R$ = resistance of the alternator field circuit including the rectifier and reduced to the alternating side of the rectifier; and
$I_1$ = generator current flowing through the second primary winding means.

References Cited in the file of this patent

UNITED STATES PATENTS

| | | |
|---|---|---|
| 2,039,314 | Harz | May 5, 1936 |
| 2,268,212 | Holubow | Dec. 30, 1941 |

FOREIGN PATENTS

| | | |
|---|---|---|
| 932,103 | France | Mar. 13, 1948 |